United States Patent [19]

Takahashi

[11] Patent Number: 5,898,655

[45] Date of Patent: Apr. 27, 1999

[54] OPTICAL RECORDING MEDIUM AND METHOD FOR SETTING POWER OF LASER BEAM

[75] Inventor: Hiroyuki Takahashi, Saitama-ken, Japan

[73] Assignee: Pioneer Electronic Corporation, Tokyo, Japan

[21] Appl. No.: 08/669,037

[22] Filed: Jun. 24, 1996

[30] Foreign Application Priority Data

Jun. 26, 1995 [JP] Japan ............................ 7-159641

[51] Int. Cl.$^6$ .............................. G11B 3/90; G11B 7/00
[52] U.S. Cl. .............................. 369/54; 369/116
[58] Field of Search .............................. 369/54, 58, 116, 369/32, 33, 44.26, 44.27, 47, 48, 50, 275.1, 275.2, 275.3

[56] References Cited

U.S. PATENT DOCUMENTS 5,072,435  12/1991  Bakx .................................. 369/116 X
5,226,027   7/1993  Bakx .................................. 369/58

FOREIGN PATENT DOCUMENTS 0 442 566A1  8/1991  European Pat. Off. .

*Primary Examiner*—Paul W. Huber
*Attorney, Agent, or Firm*—Nikaido, Marmelstein, Murray & Oram LLP

[57] ABSTRACT

An optical recording medium has a plurality of test areas on each of which test signals are written, and a plurality of power sitting information recording areas on each of which an optimum laser power obtained by reading the recorded test signal written in one of the test areas is written. An identification information of a recording system by which the test signal is written is also written on the power setting information recording area.

5 Claims, 4 Drawing Sheets

OPTICAL RECORDING MEDIUM AND METHOD FOR SETTING POWER OF LASER BEAM

BACKGROUND OF THE INVENTION

The present invention relates to an optical recording medium of write once type and a method for setting power of a laser beam for writing information in the recording medium.

As a write once type optical recording medium, a CD-R (write once type CD) is known. In the CD-R, a laser beam is focused on a recording surface to convert luminous energy to thermal energy to change the physical nature of the recording surface. Thus, the information is recorded n the CD-R.

Although the recording mediums of the same type are made by the same material, the individual recording medium has not always the same characteristic. Accordingly, if a laser beam is set to a fixed power, information can not be recorded in an optimum condition. Therefore, in such a recording medium, before recording information, the laser power is adjusted by an optimum power control (OPC) to be set to an optimum value for a disc to be recorded.

A conventional OPC method employed in the CD-R will be describe with reference to FIG. 6. The CD-R has a power calibration area (PCA) as a test area, read-in area, information recording area, and read-out area. The PCA is provided on the inside of the read-in area. A test writing is performed in the test area before recording information so as to obtain an optimum laser power for writing information on the CD-R.

In the write once type CD such as the CD-R, an area in which information has been written once is not used for further writing information again. A recorder for writing information is provided for controlling laser power by the test writing on the PCA, and for recording information on the information recording area thereafter with the controlled laser power.

As shown in FIG. 6, the CPA is divided into a hundred partitions. Since one writing test uses one partition, it is possible to perform a hundred times of the OPC.

However, the test writing over a hundred times can not be done. Therefore, even if a writable area (vacant space) remains in the information recording area, information can not be recorded thereon.

SUMMARY OF THE INVENTION

An object of the present invention is to provide an optical recording medium of a write once type and a method for setting power of laser beam for writing information in the recording medium in which the number of writing tests is increased as many as possible.

According to the present invention, there is provided an optical recording medium on which information is recorded in an information recording area by changing a physical quality thereof, comprising a plurality of test areas on each of which test signals are written for obtaining an optimum laser power for writing information on the information recording area, a plurality of power setting information recording areas on each of which an optimum laser power obtained by reading the recorded test signal written in one of the test areas, and an identification information of a recording system by which the test signal is written are written.

A method of the present invention comprising steps of writing test signals on test areas, obtaining an optimum laser power for writing information on an information recording area, writing an optimum laser power obtained by reading the recorded test signal written in one of the test areas, and an identification information of a recording system by which the test signal is written on a power setting information recording area, reading out an own identification information of the recording system recorded on the power setting information recording area, reading out an optimum laser power written in the power setting information recording area in which the own identification information is written, setting power of laser beam for recording information to the read out optimum laser power.

These and other objects and features of the present invention will become more apparent from the following detailed description with reference to the accompanying drawings.

DETAILED DESCRIPTION OF THE PREFERRED EMBODIMENTS

Figure 1:
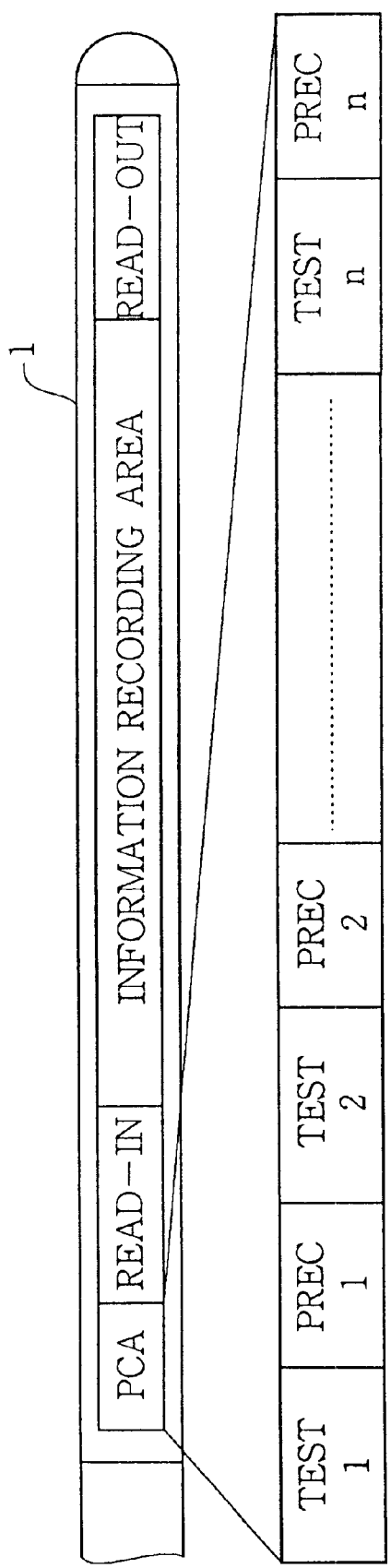
FIG. 1a is a schematic diagram showing an optical recording medium having a signal recording area according to the present invention.
FIG. 1b is a schematic diagram showing another modification of the optical recording medium of the present invention.
Figure 1:
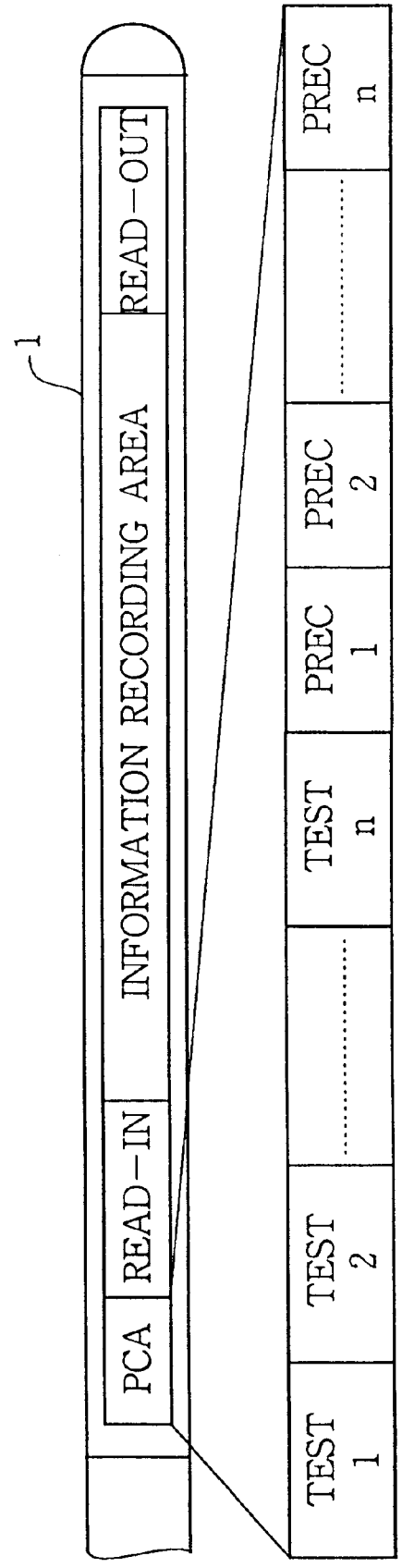

Referring to FIG. 1a, an optical recording medium (hereinafter called disc) 1 of the present invention has a signal recording area comprising a power calibration area (PCA), read-in area, information recording area, and read-out area.

The PCA comprises a plurality of test areas TEST1 to TESTn, and a plurality of power setting information recording areas PREC1 to PRECn provided corresponding to the respective test areas TEST1 to TESTn. Both of the test areas and the power setting information recording areas are alternately disposed in the PCA.

FIG. 1b shows another modification of the PCA in which a group of a plurality of test areas TEST1 to TESTn, and a group of a plurality of power setting information recording areas PREC1 to PRECn are separately provided in the PCA.

Figure 2:
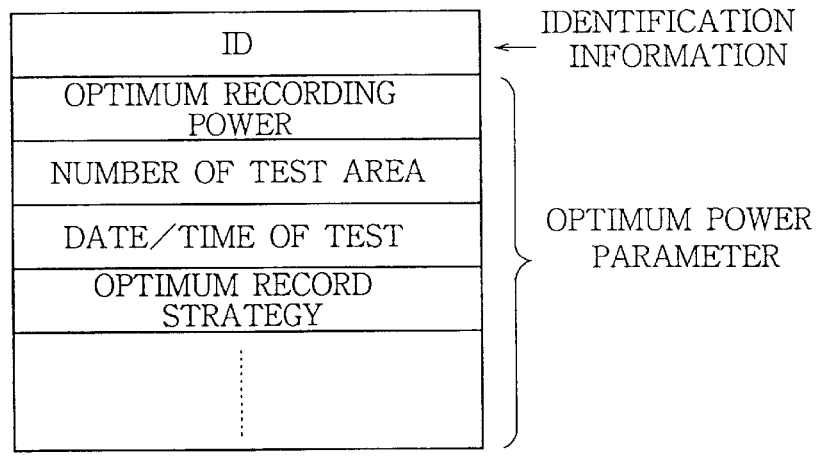
FIG. 2 is a schematic diagram showing information data for setting optimum power of a laser beam.

Referring to FIG. 2, in each power setting information recording area PREC, following data are written. Namely, identification (ID) information of a recording system by which the test writing has been done, and a predetermined optimum power setting parameter such as optimum recording power obtained based on the test writing, an area number of the test area where the test writing has been done, date and time of the test, and optimum recording strategy for indicating, for example an optimum recording signal waveform.

Figure 3:
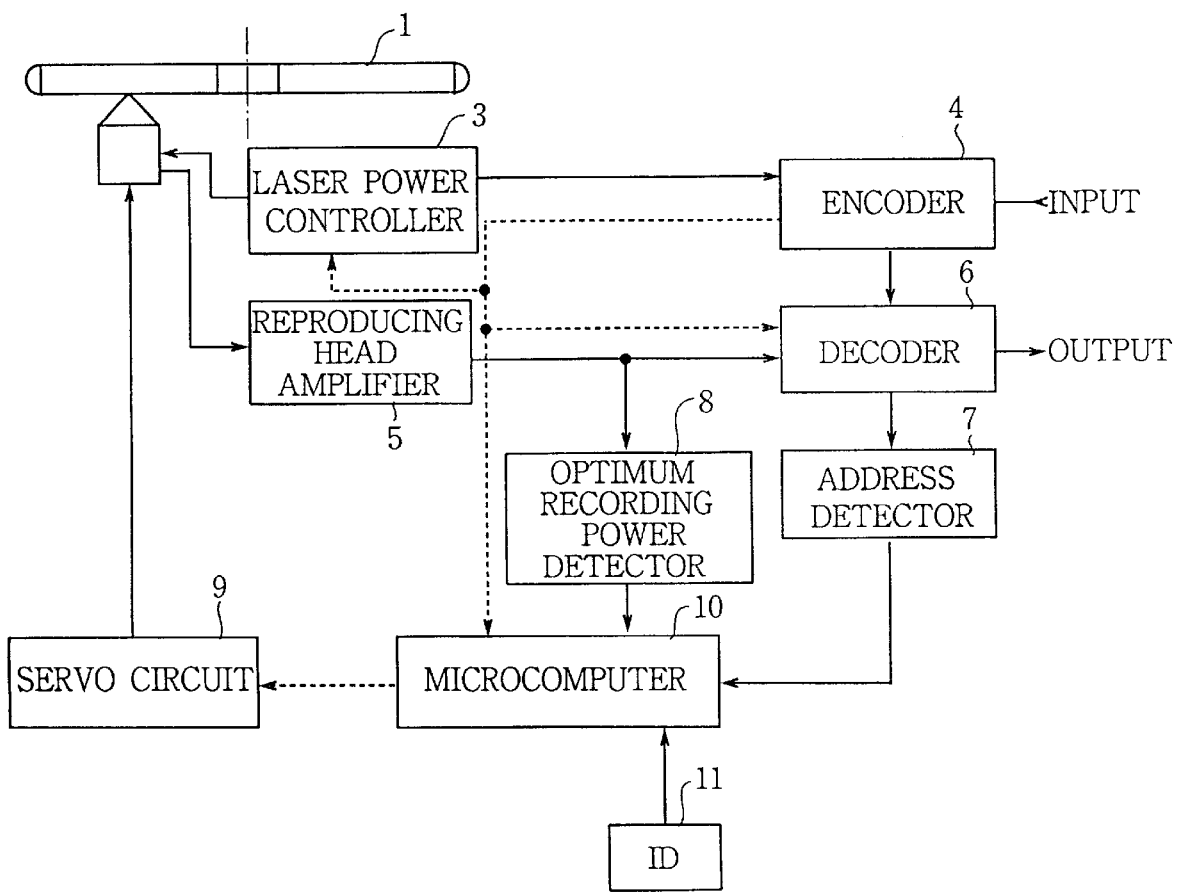
FIG. 3 is a block diagram showing a recording/reproducing system of the present invention.

FIG. 3 shows a recording/reproducing system of the present invention. The recording/reproducing system comprises an optical pickup 2, a laser power controller 3, a recording encoder 4, a reproducing head amplifier 5, a reproducing decoder 6, an address detector 7, an optimum recording power detector 8, a servo circuit 9, a microcomputer 10, and an ID memory in which an identification (ID) of the system is stored.

Figure 4:
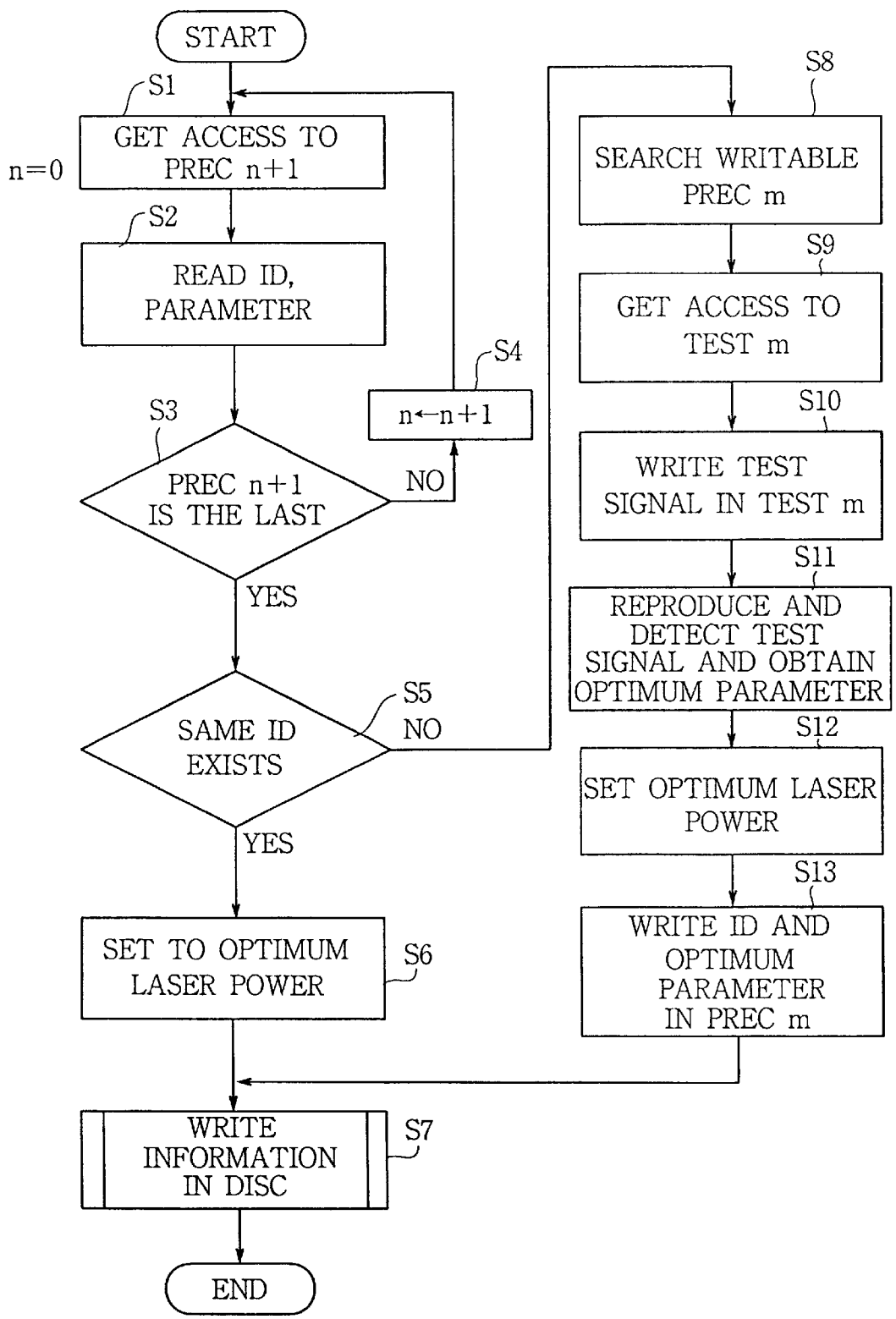
FIG. 4 is a flowchart showing an operation for controlling the laser power.

The operation for controlling the laser power will be described with reference to the flowchart of FIG. 4.

When the disc 1 is loaded on the system for recording information, a recording mode is set. The microcomputer 10 operates the laser power controller 3 for controlling luminous intensity of a laser beam emitted from the pickup head 2 and irradiated on the disc 1 to a small value for reproduction. The servo circuit 9 is operated for controlling the reproducing head amplifier 5 and the reproducing decoder 6 so as to reproduce a recording signal of the disc 1.

The information recorded in the power setting information recording areas PREC1 to PRECn in the PCA is read out in order, with reference to address information detected by the address detector 7. The read-out data are stored in a RAM (not shown) (steps S1 to S4).

At a step S5, the own ID information stored in the ID memory 11 of the system is compared with the ID information of each of the power setting information recording areas PREC1 to PRECn and it is determined whether the ID information which is the same as the own ID information of the system exists or not. If yes, it means that the system has been used for recording information on the disc 1 before.

The program goes to a step S6 where data such as the optimum recording power stored in the RAM as shown in FIG. 2 at the corresponding ID information are read out. The laser power controller 3 is controlled so that the recording power of the laser emitted from the pickup 2 is set to an optimum value.

At a step S7, the recording encoder 4 is controlled by the microcomputer 10 to apply recording information fed through an input terminal to the disc 1, controlled by the laser power controller 3. Thus, the information is written in a vacant space of the information recording area of the disc 1.

On the other hand, at the step S5, if the same ID information does not exist, it means that the system has never been used for recording information on the disc 1 before.

Figure 5:
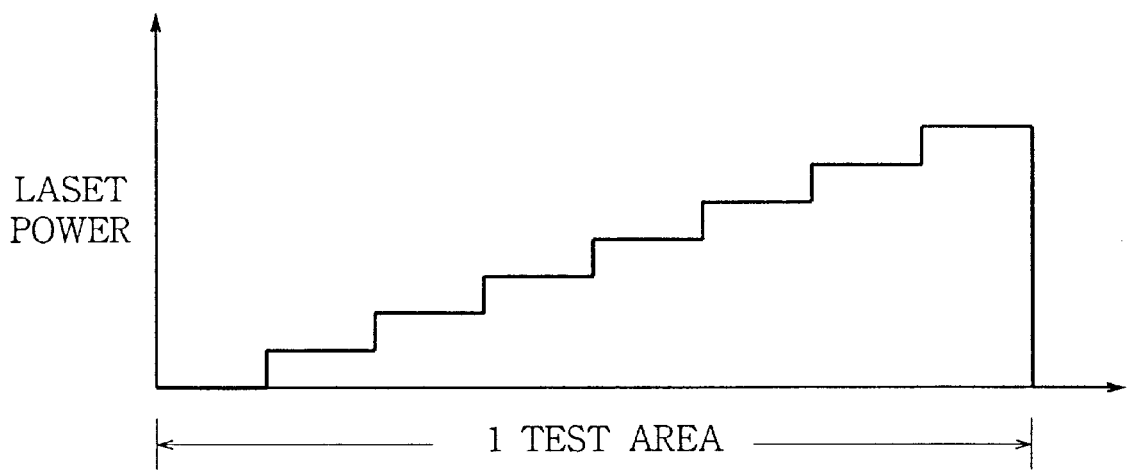
FIG. 5 is a diagram showing a test signal for a writing test.
Figure 6:
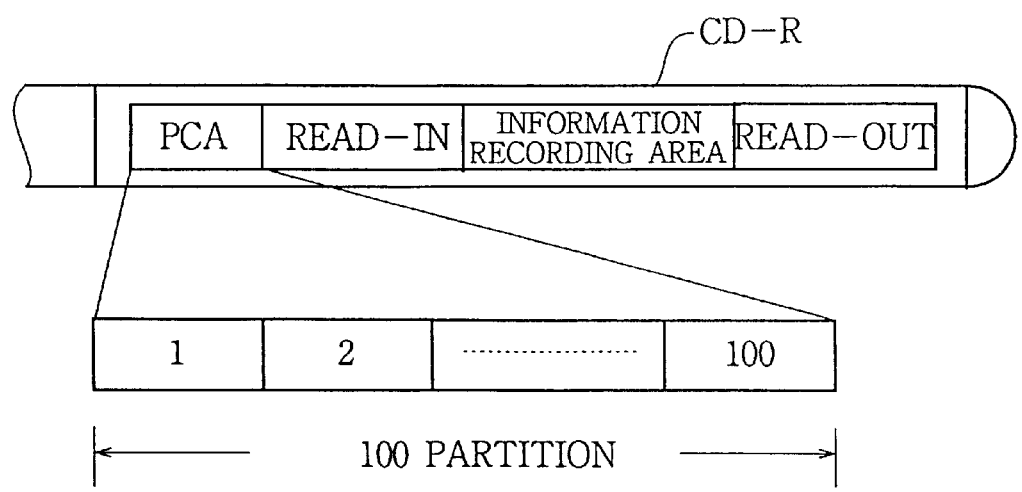
FIG. 6 is a schematic diagram showing a signal recording area of a conventional optical recording medium.

The program goes to a step S8 where a writable vacant power setting information recording area PRECm is searched. At a step S9, a test area TESTm corresponding to the writable vacant power setting information recording area PRECm is searched. At a step S10, the laser power controller 3 operates to control the power of the laser beam radiated from the pickup 2 step by step as shown in FIG. 5. Thus, writing test signals are written in the test area TESTm of the disc 1.

At a step S11, the test signals written in the test area TESTm are reproduced, and the optimum recording power detector 8 detects the amplitude level and waveform of each of the reproduced signals to obtain an optimum power setting parameter.

At a step S12, the laser power controller 3 is controlled so that the power of the laser radiated from the pickup 2 is set to an optimum value for recording information on the disc 1. At a step S13, the ID information of the system and the optimum power setting parameter are recorded on the power setting information recording area PRECm corresponding to the test area TESTm. The program goes to the step S7 where information fed through the input terminal is written in a vacant space of the information recording area of the disc 1.

The PCA provided on the inside of the read-in area may be disposed in any place in the disc 1 if search can be performed. Furthermore, although the test areas TEST1 to TESTn, and the power setting information recording areas PREC1 to PRECn are integrally disposed, these areas can be separately provided.

The embodiment of the present invention can be variously modified.

In accordance with the present invention, the results of the writing tests tested in the test areas are stored in the power setting information recording areas provided corresponding to the respective test areas. Preliminary to writing information, the information recorded on the power setting information recording area is detected to determine whether the recording system has been used before or not.

If the the recording system has been used before, the optimum power of the laser beam for writing information is set in accordance with the optimum power parameter stored in the power setting information recording area. If the system is not used, the test writing is performed in the test area.

Consequently, repetition of useless test writing is prevented, so that the test areas are not wasted. On the other hand, the number of times for the write once record can be increased to improve an effective recording operation.

Since the power information is recorded on the disc, it is not necessary to provide a memory having a large capacity in the recording/reproducing system. Thus, the cost of the system is reduced.

Furthermore, the number of times for the writing test is extremely reduced, so that capacity of the areas for the test and for recording the power setting information can be reduced.

While the invention has been described in conjunction with preferred specific embodiment thereof, it will be understood that this description is intended to illustrate and not limit the scope of the invention, which is defined by the following claims.

What is claimed is:

1. An optical recording medium on which information is recorded in an information recording area by changing a physical quality thereof, said medium comprising:

a plurality of test areas in each of which test signals are written for obtaining an optimum laser power for writing information on the information recording area; and a plurality of power setting information recording areas, each of the test areas being coupled with one of the power setting information recording areas, and each couple of areas being located at predetermined relative positions which can be relatively detected, wherein an identification information of a recording system by which each test signal is written and an optimum laser power, obtained by reading a recorded test signal in a corresponding test area, are written to a power setting information recording area corresponding to each test area of said plurality of test areas.

2. An optical recording medium on which information is recorded in an information recording area by changing a physical quality thereof, said medium comprising:

a plurality of test areas in each of which test signals are written for obtaining an optimum laser power for writing information on the information recording area; and a plurality of power setting information recording areas disposed between each of said plurality of test areas, wherein an identification information of a recording system by which each test signal is written and an optimum laser power, obtained by reading a recorded test signal in an adjacent test area, is written to a power setting information recording area corresponding to each test area of said plurality of test areas.

3. An optical recording medium on which information is recorded in an information recording area by changing a physical quality thereof, said medium comprising:

a plurality of test areas in each of which test signals are written for obtaining an optimum laser power for writing information on the information recording area; and a plurality of power setting information recording areas disposed after said plurality of test areas, wherein an identification information of a recording system by which each test signal is written and an optimum laser power, obtained by reading a recorded test signal in a test area, is written to a power setting information recording area corresponding to each test area of said plurality of test areas.

4. A method for setting a power of a laser beam for an optical disc having a plurality of test areas and a plurality of power setting information recording areas, said method comprising the steps of:

writing test signals on test areas of the plurality of test areas;

obtaining an optimum laser power for writing information in an information recording area by reading a recorded test signal;

writing an optimum laser power and an identification information of a recording system by which each test signal is written in one of the plurality of power setting information recording areas, wherein said power setting information recording areas are disposed between each of said test areas;

reading out an identification information of a recording system from the one power setting information recording area;

reading out an optimum laser power written in the one power setting information recording area in which the identification information is written;

setting the power of the laser beam to said optimum laser power, for recording information.

5. A method for setting a power of a laser beam for an optical disc having a plurality of test areas and a plurality of power setting information recording areas, said method comprising the steps of:

writing test signals on test areas of the plurality of test areas;

obtaining an optimum laser power for writing information in an information recording area by reading a recorded test signal;

writing an optimum laser power and an identification information of a recording system by which each test signal is written in one of the plurality of power setting information recording areas, wherein said power setting information recording areas are disposed after said test areas;

reading out an identification information of a recording system from the one power setting information recording area;

reading out an optimum laser power written in the one power setting information recording area in which the identification information is written;

setting the power of the laser beam to said optimum laser power, for recording information.

* * * * *